United States Patent [19]

Rahman et al.

[11] 4,109,026

[45] Aug. 22, 1978

[54] PROCESS FOR PRODUCING COMPACTED, DEHYDRATED, UNCOOKED CABBAGE AND CABBAGE PRODUCT THEREOF

[75] Inventors: Abdul R. Rahman, Natick; Stephen G. Haralampu, Belmont, both of Mass.

[73] Assignee: The United States of America as represented by the Secretary of the Army, Washington, D.C.

[21] Appl. No.: 818,701

[22] Filed: Jul. 25, 1977

[51] Int. Cl.$^2$ .......................... A23B 7/02; A23B 7/06; A23B 7/14

[52] U.S. Cl. ................... 426/640; 426/442; 426/454; 426/455; 426/456

[58] Field of Search ............ 426/640, 442, 454, 455, 426/456, 509

[56] References Cited

U.S. PATENT DOCUMENTS

| | | | |
|---|---|---|---|
| 2,509,719 | 5/1950 | Birdseye | 426/640 |
| 2,619,424 | 11/1952 | Masure | 426/456 |
| 3,973,047 | 8/1976 | Linaberry et al. | 426/456 |

OTHER PUBLICATIONS

Furia, *Handbook of Food Additives*, Chemical Rubber Co., 1968, p. 415.

*Primary Examiner*—Raymond N. Jones
*Assistant Examiner*—Elizabeth A. Hatcher
*Attorney, Agent, or Firm*—Nathan Edelberg; Robert P. Gibson; Charles C. Rainey

[57] ABSTRACT

A process for producing compacted, dehydrated, uncooked cabbage of increased density comprising subdividing fresh cabbage, treating the subdivided cabbage with aqueous sodium metabisulfite solution, removing the excess sodium metabisulfite solution, hot air blanching the cabbage, partially dehydrating the cabbage with heated air until its moisture content is reduced to about 5–8 percent by weight, partially rehydrating the cabbage to a moisture content of about 10 to 20 percent by weight with an aqueous solution of a food grade surface-active agent, equilibrating the solution of surface-active agent throughout the cabbage, compressing the partially rehydrated cabbage at a pressure of about 50 to 200 psi to obtain a compression ratio of about 7:1 to 15:1, redrying the compressed cabbage with heated air at about 55° to 65° C. until the moisture content thereof is reduced to no greater than 5% by weight, and packaging the compressed, dehydrated, uncooked cabbage in a hermetically sealed, moisture-proof container. Also, the compacted, dehydrated, uncooked cabbage obtained by the process described.

5 Claims, No Drawings

PROCESS FOR PRODUCING COMPACTED, DEHYDRATED, UNCOOKED CABBAGE AND CABBAGE PRODUCT THEREOF

The invention described herein may be manufactured, used, and licensed by or for the Government for governmental purposes without the payment to us of any royalty thereon.

BACKGROUND OF THE INVENTION

This invention relates to a process for producing compacted, dehydrated, uncooked cabbage which is capable of being reconstituted to crisp cabbage for use in salads or cole slaw, and to the improved compacted, dehydrated, uncooked cabbage product produced thereby.

Uncooked cabbage is highly susceptible to the destruction of its natural turgidity. In the preparation of salads and cole slaw containing uncooked cabbage, retention of crispness by the cabbage is important from the standpoint of acceptability of the food product containing the cabbage. Cooking tends to destroy the turgidity of cabbage and to produce a mushy cabbage product if cooking is prolonged or conducted at a high temperature. Similarly, freezing of cabbage so severely damages the cellular structure of cabbage that, even though the cabbage may be freeze-vacuum-dehydrated to permit safe, prolonged storage, the reconstituted cabbage product is very mushy, even without being cooked.

Since fresh cabbage is subject to deterioration within a short period of time in its natural state, it has been very difficult to store it for very long periods so that, after such storage, it will have substantially the same characteristics and acceptability in salads and in cole slaw as fresh cabbage has. Numerous efforts have been made to dehydrate and to compress cabbage so as to render it suitable for long-term storage in the uncooked state while still retaining the ability to be reconstituted to a state closely approximating fresh cabbage. Until the present invention, all such efforts have fallen short of attainment of a compacted, dehydrated, uncooked cabbage which could be reconstituted into a cabbage product which would be substantially like fresh cabbage, particularly in terms of turgidity as well as flavor.

Since freezing of such vegetables as cabbage, as mentioned above, destroys the cellular structure, air drying of cabbage has been experimented with for years and the air dried cabbage has been compressed to save space when the air dried cabbage is stored or shipped considerable distances. However, if the moisture content of the cabbage is reduced by air drying sufficiently to be storage stable for at least 3 years at about 20° C. or at least 6 months at about 40° C., compression of the dry cabbage has usually resulted in shattering of the structure of the cabbage particles or shreds and the production of many fines which upon reconstitution do not revert to the sizes and shapes of the original particles of cabbage. Furthermore, such air dried cabbage is slow to rehydrate in cool or cold water, which in many cases has resulted in the necessity of employing hot water to obtain reconstitution of the cabbage within a reasonable length of time, thus resulting in cooked, reconstituted cabbage, which is unsuitable for salad or cole slaw applications.

It is accordingly an object of the present invention to provide an improved process for producing compacted, dehydrated, uncooked cabbage which is rapidly reconstitutable in cool or cold water to produce uncooked cabbage having substantially the same turgidity characteristics as fresh cabbage.

A further object is to provide dehydrated, uncooked cabbage of increased density which, when rehydrated, will be restored to particle shape and form such as that of the cabbage prior to dehydration and compression thereof.

A still further object is to provide a process for producing such compacted, dehydrated, uncooked cabbage of increased density and decreased bulk which will have good storage stability when packaged and hermetically sealed in a container which is impervious to moisture, and which will be readily rehydratable after long-term storage to restore the cabbage to particle shapes and sizes such as it had prior to dehydration and compression, including good acceptability, and particularly good utility in salads or in cole slaw.

Other objects and advantages will appear from the following description of the invention, and the novel featues will be particularly pointed out in connection with the appended claims.

SUMMARY OF THE INVENTION

The dehydrated cabbage of increased density over the density thereof in its original state or in its uncompressed, dehydrated state is prepared by subdividing, e.g. shredding, the leaves of fresh cabbage, applying to the subdivided cabbage a solution of sodium metabisulfite, removing the excess of the solution of sodium metabisulfite after about 2 minutes of contact with the cabbage, blanching the cabbage with heated air starting at from about 90° to 95° C. and gradually decreasing the temperature of the heated air over a period of time of from about 15 to 25 minutes to about 50° to 60° C. at a rate substantially in a straight line relation to the time elapsed, partially dehydrating the cabbage with heated air at about 50° to 60° C. over about a 3 to 5 hour period, or with heated air at about 65°–75° C. over a period of time of about 1 to 2 hours, or with heated air at a temperature between 60° C. and 65° C. for a suitable period of time, until the moisture content of the cabbage is reduced to from about 5 to about 8 percent, applying to the cabbage a sufficient quantity of a food grade surface-active agent selected from the group consisting of polyoxyethylene sorbitan monostearate and polyoxyethylene sorbitan monooleate in an aqueous solution containing from about 0.05 to about 0.10 percent of the surface-active agent to increase the moisture content of the cabbage to from about 10 to about 20 percent, equilibrating the solution of the surface-active agent throughout the cabbage over a period of about 30 minutes, compressing the cabbage at a pressure of from about 50 to about 200 psi to produce compacted cabbage at a compression ratio of from about 7:1 to about 15:1, redrying the compressed cabbage by means of heated air at about 55° to 65° C. until its moisture content is no greater than 5 percent, and packaging the dried, compressed cabbage in a substantially moisture-impermeable container.

DESCRIPTION OF THE PREFERRED EMBODIMENT

It is to be understood that whenever a percentage is stated in either the Specification or the Claims, it is intended that this should be percentage by weight, unless otherwise indicated.

We have found that cabbage in the uncooked state, when subdivided and subjected to compression to produce dense forms of the cabbage, requires a certain amount of moisture to plasticize it so that the cellular structure of the cabbage will not be destroyed with the attendant production of large amounts of fines. The lower limit for the moisture content of uncooked cabbage to which the compression step of the invention is applicable to avoid shattering is about 10 percent.

On the other hand, fresh cabbage, white or purple, contains such a high concentration of moisture that it would be impractical to compress it as found in the natural state into a form of increased density without losing large quantities of the cabbage by extrusion between the walls of the press. The extruded material would no longer be capable of restoration to the form of the original particles of cabbage. This is caused by excessive plasticization of the cellular matter of the cabbage by the very high concentration of water therein. We have found that the practical upper limit for the moisture content of cabbage to which the compression step of the invention is applicable to avoid extrusion of the cabbage between the walls of the press employed in compressing the cabbage is about 20 percent.

Thus, in order to compress particles of subdivided cabbage in accordance with the invention without shattering them and producing a large amount of fines and without extruding a large amount of the cabbage material and thus destroying the particle form, it has been found necessary to partially rehydrate the cabbage to a moisture content of from about 10 to about 20 percent prior to compression. And it has been found to be necessary to dehydrate the subdivided cabbage to from about 5 to about 8 percent moisture content prior to the above discussed partial rehydration so that an adequate amount of a food grade surfactant may be uniformly introduced into and throughout the cabbage during the partial rehydration step to enable the cabbage, after compression and rehydration to a moisture content no greater than 5 percent, to be reconstituted rapidly in cool or cold water, thus avoiding cooking of the cabbage by reconstitution thereof with hot water.

The hot air blanching and hot air partial drying of the cabbage may be carried out in various types of air drying equipment. We have found a Proctor and Schwartz cabinet dryer to be particularly suitable for these purposes. We have found it to be particularly effective to conduct the hot air blanching beginning at about 90° to 95° C. in order to inactivate peroxidase, the enzyme in cabbage which is most difficult to inactivate. The air temperature is gradually decreased to about 50° to 60° C. over a period of about 15 to 25 minutes at a rate substantially in a straight line relation to the time elapsed. The partial dehydration is accomplished by maintaining the air temperature at about 50° to 60° C. for another approximately 3–5 hours; or, if it is desirable to do so, the partial dehydration may be accomplished with heated air at about 65° to 75° C. over a period of about 1 to 2 hours, or some intermediate temperature for the time needed. In either case, the partial dehydration is continued until the moisture content of the cabbage is reduced to from about 5 to about 8 percent.

The compressed cabbage, produced as described above, may take various forms and may be produced in various sizes. We have found it particularly advantageous to produce either compressed bars or compressed discs of from about ⅜ inch to about ½ inch thicknesses.

The compressed cabbage, whatever the form thereof may be, is removed from the press and redried by means of heated air at from about 55° to about 65° C. For most purposes, air drying will be quite adequate since the moisture concentration can be reduced by air drying to as low as about 4 percent. Any moisture concentration in the compressed, dehydrated cabbage of not greater than 5 percent is sufficiently low for the cabbage to be storage stable for at least 3 years at 20° C. or at least 6 months at 40° C. when the compressed, dehydrated cabbage is hermetically sealed in a moisture impermeable package. The density of the compressed and dehydrated cabbage mass will generally be from about 0.5 to about 0.9 grams per cc.

Following redrying, the compressed cabbage mass, if not to be used immediately, as is usually the case, is enclosed in a package which is impermeable to moisture and hermetically sealed therein. Such a package may be a metal can, but may also be a flexible package made of a laminate which usually comprises one lamina which is heat-sealable, such as polyethylene, another lamina, which is strong and resistant to most types of damage, such as polyethylene terephthalate, and is employed as the outermost lamina; while aluminum foil, which acts as an effective barrier to moisture, is sandwiched between the inner, heat-sealable polyethylene lamina and the strong outer lamina of polyethylene terephthalate. When hermetically sealed in metal cans or the type of laminated flexible package described above, the compressed and redried cabbage mass will usually be safely storable for at least 3 years at 20° C. or at least 6 months at 40° C. without any appreciable reduction in acceptability from the acceptability it exhibited immediately following partial air drying, compression, and redrying as described above.

Rehydration or reconstitution of the compacted, dehydrated, uncooked cabbage mass may be carried out by placing it in excess water (approximately 50 parts of water to 1 part of cabbage by weight) at about 4.4° C. and allowing it to stand in contact with the cool water for about 2 hours. The cabbage is essentially fully rehydrated as a result of this treatment and, when separated from the excess water, may be incorporated in salads or in cole slaw with good results compared with similar uses of fresh cabbage. Other conditions may be employed for rehydration of the compacted, dehydrated, uncooked cabbage; but it is preferred to keep the temperature of the rehydration water sufficiently low that cooking of the cabbage will not occur during rehydration, although cooked cabbage may be produced from the product of the invention, if desired, by employing higher temperatures during rehydration or subsequent thereto. However, some of the outstanding advantages of the process of the invention over the prior art methods of preserving cabbage are lost if cooked cabbage is the desired end product.

We will now disclose a specific example of the production of compacted, dehydrated, uncooked cabbage of increased density in accordance with the above-described principles. It will be understood, of course, that the above-mentioned and other advantages may also be accomplished by suitable variations in the detailed method steps, about to be set forth below, which are intended to be for illustrative purposes, and not for limiting the scope of our invention.

In the examle and the claims, compression ratio is to be understood to be the ratio of the volume of the uncompressed cabbage particles or shreds or other forms of subdivision, shaken by hand to effect settling in a container, to the volume of the compressed cabbage, whether the compressed cabbage be in disc or bar form or some other suitable compacted mass.

EXAMPLE

Fresh white cabbage was washed, drained free of the wash water, and sliced into shreds of about 0.5 cm width and varying lengths. The shredded cabbage was covered with an aqueous solution of sodium metabisulfite, containing 10 grams of sodium metabisulfite per liter of solution, for about 2 minutes. The excess solution was separated from the shredded cabbage, which was then placed in perforated trays in a hot air oven, the temperature of which was initially 93° C. and was gradually decreased over a 15 minute period to 55° C. at a rate substantially in a straight line relation to the time elapsed, during which blanching of the cabbage was accomplished. The cabbage was then maintained in heated air at about 55° C. for about 4 hours, during which time the moisture content of the cabbage was reduced to about 5 percent.

The partially dehydrated, blanched cabbage, protected with sodium metabisulfite, was then uniformly sprayed with a sufficient amount of 0.05 percent aqueous solution of food grade polyoxyethylene sorbitan monooleate ("Tween" 80), a surface-active agent manufactured by ICI United States Inc., Wilmington, Del., 19897 to increase the moisture content of the cabbage to about 12 percent. The cabbage treated with the surface-active agent in aqueous solution was enclosed in a polyethylene bag and maintained in the closed bag for about 30 minutes to permit the solution of surface-active agent to become equilibrated throughout the shredded cabbage in order to avoid shattering of any portion of the cabbage during compression.

The equilibrated cabbage was then compressed into discs of about 3.75 inches diameter and about ⅜ inch thickness at about 100 psi pressure in a hydraulic press. The compression ratio was about 8:1. The compressed discs of cabbage were then redried in an air oven at about 65° C. until the moisture content had been reduced to slightly below 5 percent. The redried, compressed discs of cabbage were inserted in a No. 2½ metal can, which was then hermetically sealed under vacuum.

Discs of the compacted, dehydrated, uncooked cabbage were removed from the cans and rehydrated by placing them in a vessel with 50 parts of water at about 4.4° C. to 1 part of cabbage and allowing the discs to stand in the cool water for 2 hours, at which time the excess water was drained from the cabbage and the substantially fully rehydrated, shredded cabbage was used to make cole slaw and also to prepare a vegetable salad by mixing the reconstituted cabbage shreds with other uncooked vegetables. Both the cole slaw and the mixed vegetable salad were quite acceptable, in fact substantially as acceptable as cole slaw and mixed vegetable salad similarly prepared but employing fresh, uncooked and untreated cabbage instead of the compacted, dehydrated, uncooked cabbage which had been rehydrated in water at about 4.4° C., as described above. A somewhat better rehydrated cabbage product for making cole slaw or mixed vegetable salad was obtained by permitting the cabbage to stand over about an 18 hour period (overnight) in contact with the water maintained at about 4.4° C. before using it for making cole slaw or salad; but the prolonged rehydration time was not necessary for obtaining acceptable cole slaw or mixed vegetable salad containing uncooked cabbage.

A further improvement in the firmness of the reconstituted, uncooked cabbage may be obtained by providing the subdivided cabbage with a treatment with 0.03 molar calcium chloride solution in water either before or after the treatment with the sodium metabisulfite solution.

Purple cabbage as well as white, or green and white, cabbage may be preserved in the uncooked state by this process.

It will be understood that various changes in the details, materials, and processing conditions which have been herein described and illustrated in order to explain the nature of the invention, may be made by those skilled in the art within the principle and scope of the invention.

We claim:

1. A process for the preparation of compacted, dehydrated, uncooked cabbage, which comprises the steps of:
   a. subdividing the leaves of fresh cabbage,
   b. covering the subdivided cabbage with a solution of sodium metabisulfite,
   c. removing the excess of said solution of sodium metabisulfite from said cabbage,
   d. blanching the subdivided cabbage with heated air beginning with air at a temperature of about 90°-95° C. and gradually decreasing the temperature of said air to about 50°-60° C. over a period of about 15-25 minutes at a rate substantially in a straight line relation to the time elapsed,
   e. partially drying said cabbage by means of heated air at about 50°-75° C. until the moisture content of said cabbage is from about five to about eight percent by weight,
   f. partially rehydrating said cabbage by applying thereto an aqueous solution of a food grade surface-active agent selected from the group consisting of polyoxyethylene sorbitan monostearate and polyoxyethylene sorbitan monooleate until the moisture content of said cabbage is increased to from about 10 to about 20 percent,
   g. equilibrating said aqueous solution of said surface-active agent throughout said cabbage,
   h. compressing said cabbage to a compression ratio of from about 7:1 to about 15:1, and
   i. redrying the compressed cabbage by means of heated air until its moisture content is no greater than 5 percent.

2. A process according to claim 1, wherein in said step of applying to the subdivided cabbage a solution of sodium metabisulfite, said solution of sodium metabisulfite is an aqueous solution containing about 10 grams of sodium metabisulfite per liter of solution and said solution of sodium metabisulfite is applied to said cabbage over a period of about 2 minutes.

3. A process according to claim 2, wherein in said step of drying said cabbage after said step of blanching the subdivided cabbage, said cabbage is partially dried by means of heated air at from about 50°-60° C. to about 65°-75° C. over a period of from about 5 hours to about 1 hour.

4. A process according to claim 3, wherein in said step of partially rehydrating said cabbage, said cabbage is partially rehydrated with an aqueous solution containing about 0.05-0.1 percent of said surface-active agent until its moisture content is increased to from about 10 to about 20 percent.

5. A process according to claim 4, wherein in said step of compressing said partially rehydrated cabbage, said compression is carried out at from about 50 to about 200 psi to produce a compression ratio in said cabbage of from about 7:1 to about 15:1.

* * * * *